May 30, 1967 R. F. KNUDSON ET AL 3,322,405
HUMIDIFIER
Filed Sept. 1, 1965 3 Sheets-Sheet 1

INVENTORS
ROBERT F. KNUDSON
HAROLD N. MINICK
KIP J. HOAG
BY
Robert W. Latham
ATTORNEY May 30, 1967 R. F. KNUDSON ETAL 3,322,405
HUMIDIFIER
Filed Sept. 1, 1965 3 Sheets-Sheet 2
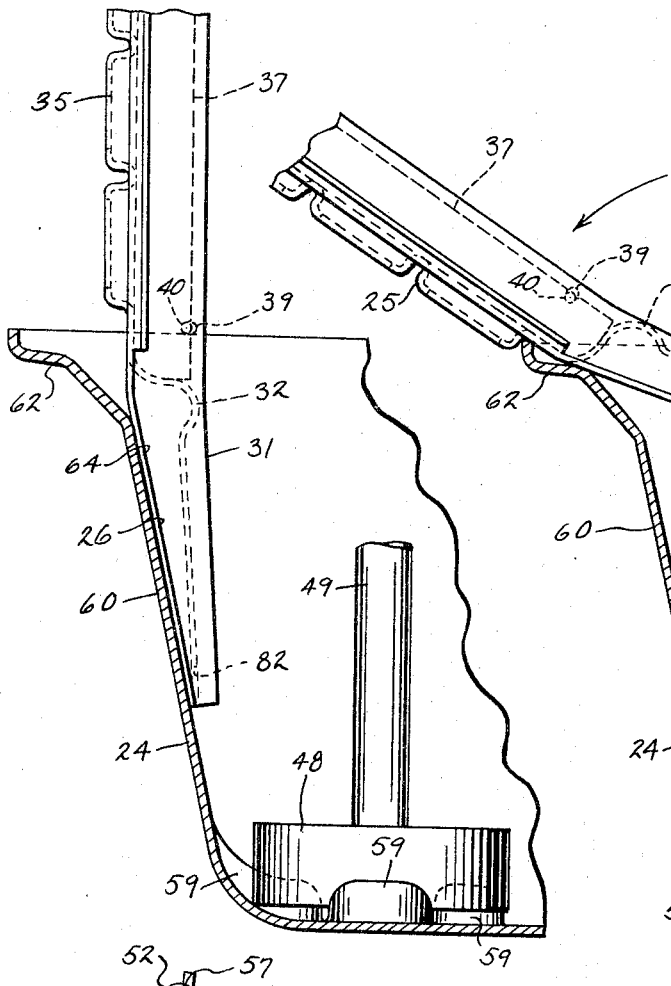
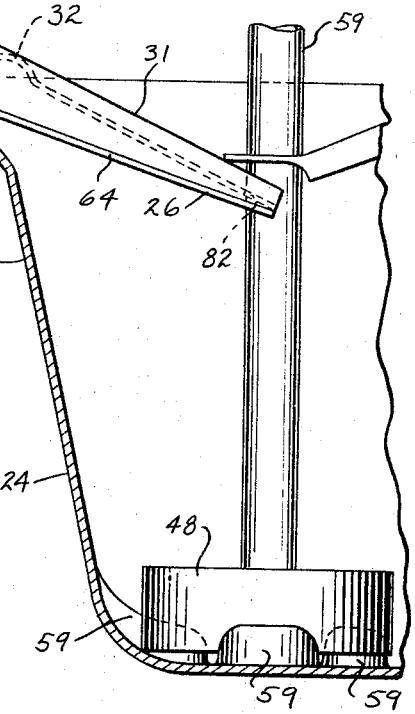
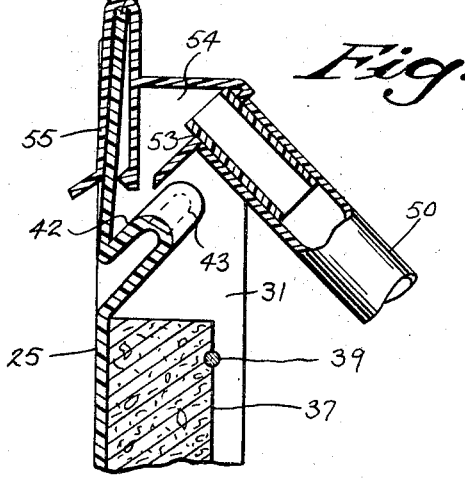
INVENTORS
ROBERT F. KNUDSON
HAROLD N. MINICK
KIP J. HOAG
BY
ATTORNEY May 30, 1967 R. F. KNUDSON ET AL 3,322,405
HUMIDIFIER
Filed Sept. 1, 1965 3 Sheets-Sheet 3

INVENTORS
ROBERT F. KNUDSON
HAROLD N. MINICK
KIP J. HOAG

BY
ATTORNEY

United States Patent Office 3,322,405
Patented May 30, 1967

3,322,405
HUMIDIFIER
Robert F. Knudson, Concord, Harold N. Minick, Marshall, and Kip J. Hoag, Albion, Mich., assignors to McGraw-Edison Company, Milwaukee, Wis., a corporation of Delaware
Filed Sept. 1, 1965, Ser. No. 484,317
5 Claims. (Cl. 261—27)

The present invention relates to humidifiers and, more particularly, to humidifiers of the type where air circulating means is used to induce a flow of air through a moisturized air permeable filter to increase the absolute humidity of the ambient air.

A problem associated with such humidifiers is the support of the filter medium in the path of air flow through the unit. Commonly used filter materials are notoriously weak, particularly in tension. A common material used for this purpose is cotton flocked expanded cellular polyurethane. Since the air flow is directed through the filter when the latter is moisture ladened, there must be adequate support to insure a long useful life while maintaining a maximum free area for effective air flow. In the humidifier of the present invention, a filter panel has been provided that secures to the unit housing so that the air flow is directed through the vaporizer-filter. The panel further provides projecting wall portions at the side and bottom of the filter and an apertured grid along one major surface of the filter with the filter medium retained therein by rods that extend between the projecting sidewall portions. The filter is positioned within the adjoining wall portions and supported without placing the material of the filter in tension.

The filter panel also has an integrally formed water distributor channel overlying the filter with rectangularly shaped notched openings leading from the channel to afford nearly uniform water delivery to the filter even if the appliance is standing on a nonlevel floor or other support surface.

Water is supplied to the distributor channel from the reservoir through a flexible conduit and a fitting releasably connected to the filter panel. The fitting carried by the filter panel can be removed without the hazard of water from the unit being pumped onto adjoining furnishings should the water circulating mechanism be operated at any time during the removal or when the panel is removed from the unit. The present structure, in addition, can be used to pump out the water reservoir when desired by disconnecting the fitting, which clips over the marginal edge of the filter panel, and placing it in another vessel.

The filter panel of the applicant's device is further provided with a downwardly depending skirt that extends below the water level in the reservoir to provide a surface which overflow water from the filter can follow back to the reservoir in a smooth quiet flow rather than giving rise to the noise that accompanies falling water particles which drip from the lower end of a filter or surrounding structure. The skirt portion also aids in effecting a seal to assure that the air flow does not detour around the lower end of the filter panel when passing through the unit. When the filter panel is pivoted away from the housing with the sideward projecting flanges resting on the reservoir, the skirt abuts the pump shaft structure to limit the rearward pivotal movement of the panel.

The exterior of the applicant's filter panel has surrounding wall portions about the air inlet opening, which wall portions project away from the appliance. By using these projecting walls, it is unlikely that draperies or similar adjoining household furnishings will be drawn by the air flow against the moist vaporizer-filter surface to become spotted or damaged or by capillary action cause water to escape from the filter to the floor. In addition, the wall structure about the apertures prevents bridging by air borne lint and dust or minerals from the water between the filter and the adjoining supporting structure which can create a path for water leakage from the unit to the rug or floor beneath the appliance. Bridging by such materials is also restricted at the interior surface of the filter panel by the projecting wall portions that position the filter at each vertical side.

In the applicant's device the reservoir is provided not only with a rearwardly extending lip for easy filling but also has a fill trough at the front to avoid the necessity of moving the appliance away from an adjoining wall each time the reservoir requires refilling.

The air drawn through the filter adjoining the inlet opening is discharged from the unit at a relatively high velocity, when considered from the standpoint of the comfort of the occupants of the area surrounding the appliance. The vaporization of water causes a cooling effect and even when the air is reheated the motion has an adverse effect on the comfort level. It is also desirable not to redirect the path of air flow within the unit since the more direct the air flow through the unit the greater the volume of air delivery and the greater the efficiency of the air circulating means. It is, therefore, desirable to direct the air where it causes least discomfort while minimizing the extent to which the air flow is redirected. In the applicant's device, the discharge opening is a vertical perforated grill through which the air is upwardly directed at an inclination of about 30 degrees. The vertical grill prevents restriction by articles being accidentally placed thereon as might become a hazard with a discharge through a horizontal grill in the top of the housing while minimizing the air disturbance initiated by the discharge from the appliance.

It is an object of this invention to provide a vaporizer-filter supporting structure that retains the filter without placing a tensile stress upon the filter medium.

It is a further object of this invention to afford a filter medium supporting structure that resists bridging between filter and support by water borne minerals or air borne particles and resists contact between filter ends and surrounding furnishings to prevent water damage to floors, carpets and adjoining furnishings.

It is also an object of this invention to provide a noiseless return of excess water to the reservoir.

It is an additional object of this invention to provide a water distribution system that is effective when the appliance is supported on an uneven surface.

It is a further object of this invention to provide a water delivery means from the reservoir to the filter that will not accidentally permit discharge of water from the appliance when the filter is removed.

It is a further object of this invention to provide a structure that will allow the reservoir to be pumped out using the water circulating pump of the appliance.

It is also an object of this invention to provide an upwardly directed air discharge through a grill surface that is substantially upright to prevent the placement of articles thereon.

It is a further object of this invention to afford conveniently accessible front filling means for refilling the water reservoir of the appliance.

These and other objects and advantages of this invention will become apparent from the following description when taken in connection with the accompanying drawings, wherein:

FIGURE 2 is a section view of the rear of the reservoir and a side elevation of a lower portion of the filter panel;

FIGURE 3 is a view similar to FIGURE 2 with the filter panel shown at its maximum rearward inclination while resting on the upper edge of the reservoir;

FIGURE 5 is a section view along the center line of the filter panel, as indicated in FIGURE 1, showing the upper portion of the filter panel and the water distributor fitting;

Figure 1:
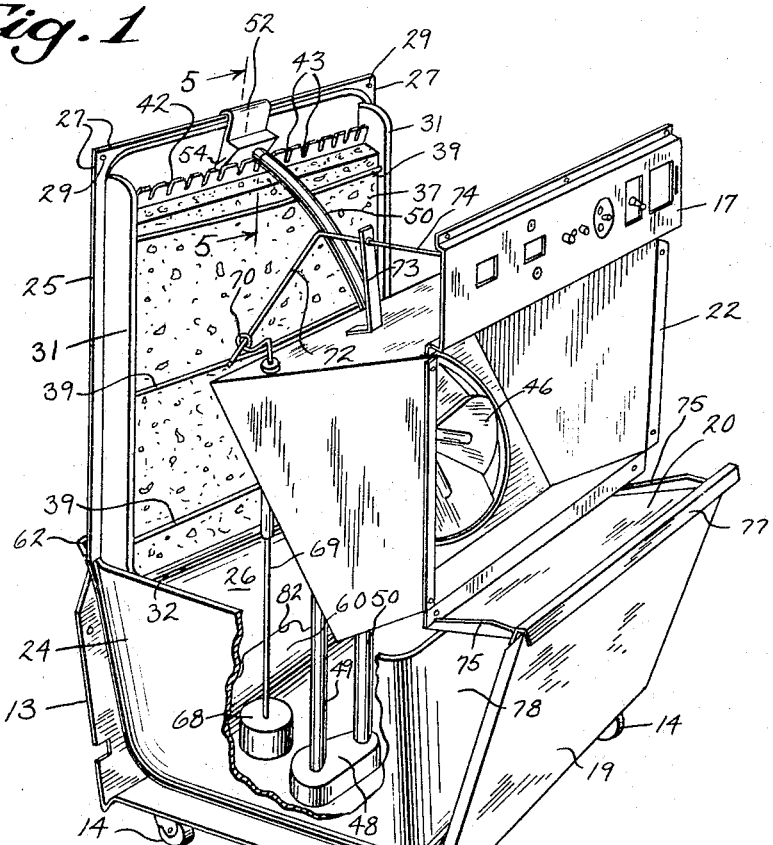
FIGURE 1 is a perspective view of the humidifier of this invention with portions of the housing removed and the reservoir partially broken away.
Figure 7:
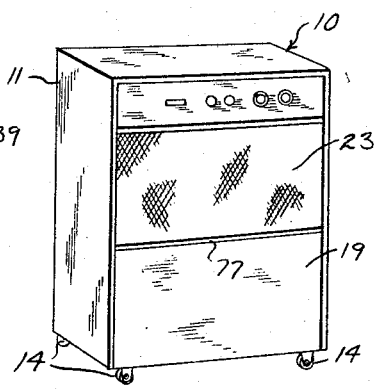
FIGURE 7 is a perspective view of the exterior of the humidifier of this invention.
Figure 4:
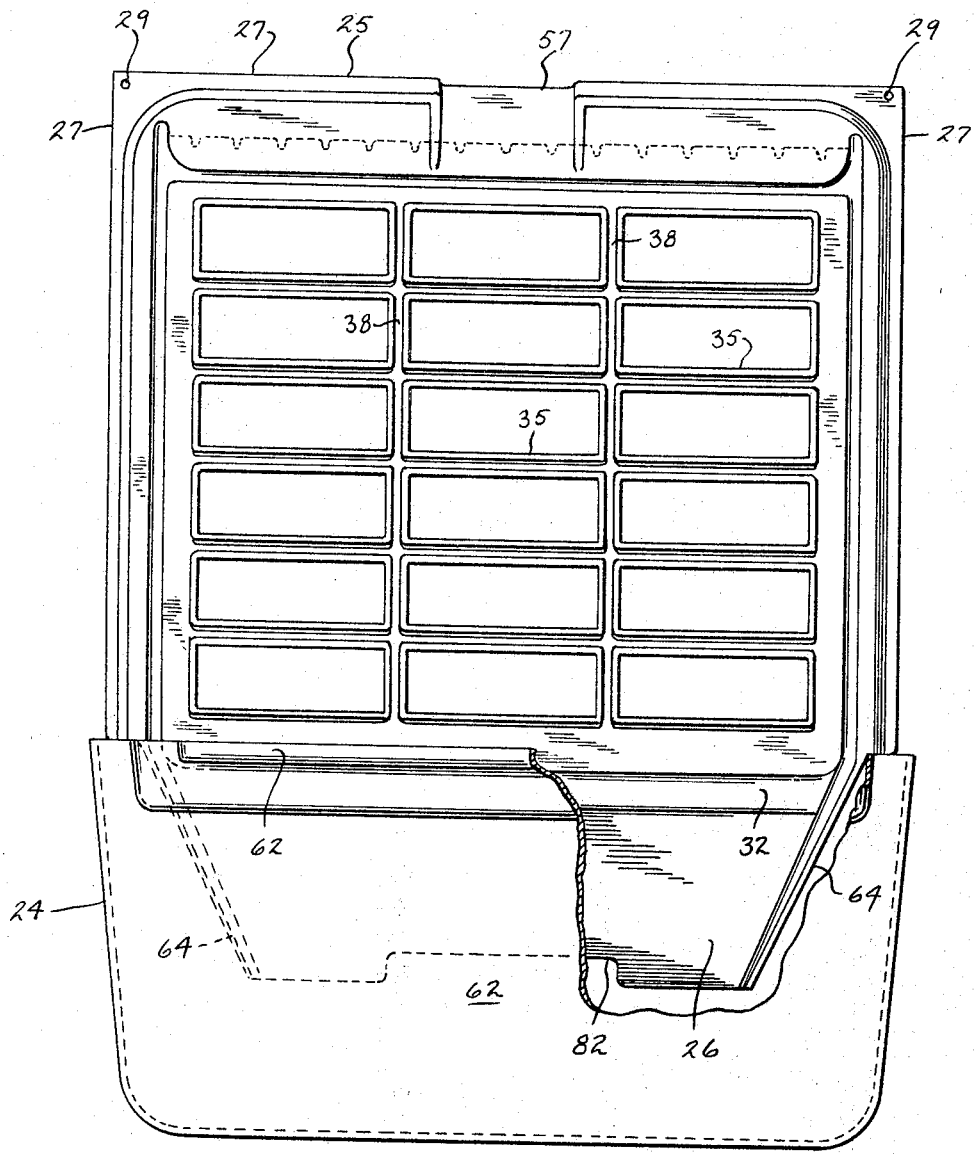
FIGURE 4 is a rear view of the filter panel with portions shown in phantom view and the reservoir with a portion thereof broken away.

Referring to FIGURES 1 and 7, the general organization of the humidifier 10 of this invention is shown as contained within a cabinet having a U-shaped enclosure portion 11 which forms the top and sidewalls. The U-shaped enclosure portion 11 is fastened with sheet metal screws to a bottom panel 12 with an upwardly turned rear portion 13 and the entire unit is supported on a series of casters 14 attached to the lower surface of the bottom panel 12. The front of humidifier has at the top a control mounting panel 17 and at the bottom a lower wall portion 19 which is pivotally connected to the bottom panel 12 at its lower marginal edge and carries a fill trough or apron 20 secured along the upper horizontal margin. Mounted within the housing intermediate the lower wall portion 19 and the control mounting panel 17 is an upwardly inclined venturi housing assembly 22 or plenum chamber across the front of which is an overlying grill 23 forming the balance of the front side of the humidifier. A water reservoir 24 is disposed within the bottom of the humidifier housing supported on the bottom panel 12 and formed of high impact vacuum formed plastic.

Figure 6:
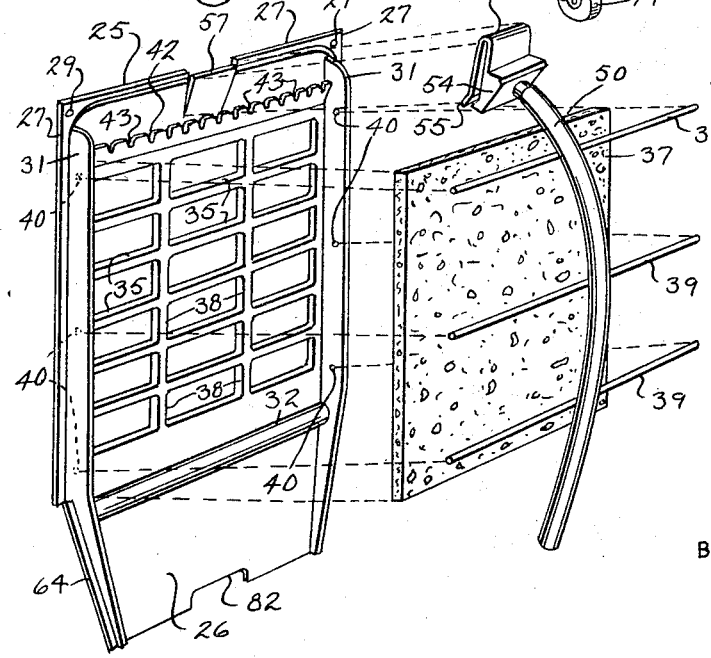
FIGURE 6 is an exploded view of the filter panel, filter medium, support rods, water distributor fitting and flexible conduit which are in their operating condition normally interconnected.

The rear wall above the upwardly turned portion 13 of the bottom panel 12 is completed by a vacuum formed plastic filter panel 25 which has a downwardly extending skirt 26 extending within the reservoir 24 and top and sidewardly projecting marginal flange portions 27 that overlie the flanged marginal edges of the housing U-shaped wall portion 11 and is secured thereto by a pair of thumb screws which extend through apertures 29. A pair of vertically extending wall portions 31 are formed at the base of the side flange portions 27 as an integral part of the filter panel and extend downwardly along the margin of the depending skirt 26 to terminate within the reservoir. A second inwardly extending wall portion 32 projects horizontally across the filter panel between the wall portions 31 but to a lesser height than wall portions 31. Along the principal surface of the filter panel a series of apertures are formed with rearwardly extending walls 35 projecting away from the rear surface of the filter panel and surrounding each of the apertures. A filter medium 37, as seen in FIGURE 6, overlies the apertured portion of the filter panel 25 along the interior surface thereof and is positioned and supported between the sidewalls 31 and above bottom wall 32. The filter 37 is supported by the filter panel 25 as defined by the partitions 38 about the apertures held in place by a series of rods 39 which are received in holes 40 in the sidewalls to retain the filter medium 37 in compression between the rods and the interior surface of the filter panel partitions 38. By being so supported, the filter 37 will not tear even when subjected to the weight of water and accumulated minerals and household dust or when the tensile strength of the media is impaired by contact with certain types of water. The rods 39 retaining the filter medium 37 against the apertured surface of the filter panel are accurately positioned to assure a smooth, even flow of water through the vaporizer-filter as well as to prevent the escape of water from the unit. The vertical walls 31 are each formed of two spaced layers of the plastic material during the vacuum forming of the filter panel. The holes which receive the rods are drilled through the inner layer of material only. The rods 39 are flexed to permit assembly or disassembly and are confined axially in the assembled condition between the outer layers of plastic material that form the wall portions 31. By varying the rod positions, filters of various thickness and capacity may be used, the thicker the filter medium, the greater the usable life since as the thickness increases the tolerable mineral build-up increases. The filter 37 is composed of cotton flocked expanded cellular polyurethane which is air permeable and provides both air filtration and humidification with respect to air passed thereto when the medium is maintained moist by a supply of water distributed throughout. Overlying the filter medium 37 and integrally formed as a part of the filter panel 25 is a distribution channel 42 seen in section in FIGURE 5. Providing communication between the distribution channel or trough 42 and the filter 37 are a series of notches 43 of essentially rectangular section, which though rounded and having a slight draft, to permit molding of the part, have substantially parallel sidewalls so that the gravity water delivery between the distribution channel 42 and the filter 37 is substantially uniform even if the appliance is supported on an uneven floor form causing the distribution channel 42 to be nonhorizontally aligned or if there is a change in the pumping rate of water from the reservoir. The open unitary construction of distribution channel 42 and the notched openings 43 afford easy inspection and cleaning.

A double-shafted motor (not shown) mounted at the rear of the venturi housing assembly 22 drives both the fan 46 which circulates a flow of air through the humidifier unit and a pump 48 which supplies water to the vaporizer-filter medium 37. The pump 48 is driven by a shaft which extends through a vertically extending sleeve 49 and has an output opening to which is connected a flexible water carrying conduit 50 which interconnects the pump with a distributor fitting 52. The distributor fitting, shown in FIGURES 1, 6 and in section in FIGURE 5, is formed of a length of an extrusion through one wall of which has been connected a length of plastic tubing 53 for connection with the flexible conduit and at the ends a pair of end plates 54 to confine the outlet to the slotted portion at the bottom overlying the water distribution channel 42. A turned rear leg portion 55 of the fitting provides a quick-connect means that clips over the filter panel top central portion 57 which is offset inwardly from the balance of the panel to provide a wall portion over which the clip formed by leg 55 may be applied and which also centrally positions the fitting in a positive location. The distributor fitting 52 has an internal capacity and configuration to channel water evenly and quietly into the distribution channel 42 without external splashing or internal gurgling noises.

As seen in FIGURES 2 and 3, a series of three protuberances 59 are formed in the bottom of the water reservoir 24 to provide support for the pump 48 at its lower terminal end. The rear wall 60 of reservoir 24 is inclined rearwardly with an upper rearwardly extending lip 62 provided for convenience in filling the reservoir from the rear. The filter panel skirt 26 has flanges 64 along the margins of the vertical edges which closely conform to the inclination of the reservoir rear wall to prevent or restrict air flow which might occur between the skirt and reservoir inner wall above the water level of the reservoir.

Also shown in FIGURE 1 is a liquid level indicating mechanism including a float 68 carried by a lower float support rod 69 that extends through the sleeve supported on the venturi housing assembly 22 and terminates in a loop portion 70 through which is received the end of an upper float rod 72. The upper float rod 72 passes through an aperture in the float rod support bracket 73 carried by the venturi housing assembly 22 and pivots around the axis of the horizontal portion 74 to actuate an indicator mechanism as the float rises or falls. The unit may be filled either by delivering water through the rear of the unit using the rearwardly projecting lip 62 at the upper portion of the reservoir rear wall to aid in refilling or from the front which avoids moving the appliance away from the wall each time refilling is required. Front filling is facilitated by a trough or fill pan 20 having upwardly turned flanges 75 along each transverse edge and which is secured to the lower wall portion 19. To fill the unit from the front it is only necesary to pull on the trim strip 77 to unlatch the front lower wall portion 19 and pivot it forward until a downwardly flanged portion at the rear of the fill pan engages the upper edge of the reservoir front wall 78. In this condition, the trough 20 is downwardly inclined toward the reservoir 24 and terminates with the rearward end disposed to deliver water to the reservoir. In operation the fan 46 is inclined upwardly to deliver air at an angle approximately 30 degrees from horizontal. By so doing, the discharge through the front grill 23 has a substantial upward component to minimize the air disturbance in the vicinity of the humidifier caused by the penetration of the cold discharge into the room and, consequently, limit any discomfort that air movement causes. In addition, the air discharge opening is as large as practicable with a maximum free opening in the grill 23 to minimize the discharge air velocity and, accordingly, any accompanying draft. The air flow moves through the unit coming in generally, horizontally through the filter panel apertured portion and is discharged upwardly at an angle of 30 degrees. Thus, by causing a minimum deflection of the path of air flow there is no significant impairment of the efficiency of the air circulating unit, which affords high humidifying capacity while a nonhorizontal discharge is attained. This air flow path further reduces the noise that would accompany the change of direction of the air flow path within a confined space. While the air is discharged with an upward component, the grill over the discharge opening is vertical which prevents the accidental deposit thereon of articles that would inhibit the air flow or even cause a hazard in such units as are provided with a reheat coil at the rear of the discharge grill. The motor driving the fan has at its opposite end a flexible coupling (not shown) which drives the rotary pump 48 to deliver water through the flexible conduit 50 and fitting 52 to the water distribution channel 42 and ultimately to the vaporizer-filter medium 37 to maintain the vaporizer in its saturated condition. Overflow water from the filter is confined between the inwardly projecting sidewalls 31 and passes quietly along the surface of the skirt 26 to be returned to the reservoir 24 without the noise that would be created if particles were to fall freely from the lower terminal end of the filter to the water below. The filter panel 25 substantially seals the housing rear wall area above the water level in the reservoir 24 restricting inlet air flow to the apertured area of the filter panel. The projecting walls 31 and the embossment 80 at either transverse side of the wall portion 57 which carries the distributor fitting 52 serve to position the filter panel 25 with respect to the flanges of the U-shaped housing section 11. The filter panel is secured to the cabinet U-shaped wall "portion" by the abutting overlying relation of the flanges 27 disposed at either side and along the top of the filter panel with respect to the housing portion flanges. At its lower end, the filter panel 25 terminates in the skirt 26 which projects below the level of the water in the reservoir 24 to resist any flow of air about the lower end of the filter panel. The transverse marginal flanges 64 of the skirt at the lower portion of the filter panel conform to the contours of the reservoir 24 to as far as practicable effect an air seal. The air drawn through the vaporizer-filter medium 37 causes a suction along the rear side of the filter panel which is also the rear wall of the humidifier that can attract adjacent draperies or other loosely supported furnishings and if permitted to come in contact with the filter medium, these furnishings can become saturated with water and by capillary action carry the water from the unit to the carpeting, floor or other support surface and damage both the contacting materials and the floor or carpet. To avoid this, the rearwardly projecting wall portions 35 surrounding each of the air inlet opening portions of the filter panel are provided to discourage or prevent contact with the surface of the filter medium. These wall portions 35 extend away from the rear surface of the filter panel and then are flanged inwardly. The wall surfaces also prevent the build-up, under any normal conditions of operation, of water borne minerals or air borne particles from bridging between the vaporizer-filter and the surrounding structure to permit water from the filter to be carried by capillary action to the exterior surface of the filter panel. Likewise, the vertical wall sections that adjoin either side of the filter panel and extend inwardly prevents bridging action of water borne minerals and air borne particles from permitting water to be transferred by capillary action to the supporting surfaces to which the filter panel is attached. Such bridging action might permit water to be carried to the exterior surface of the cabinet where it would not be desired and could cause damage.

When it is desired to service the unit either to clean its water distribution channels and the filter medium or to drain the reservoir and prepare the unit for out-of-season storage, the thumb screws that secure the filter panel to the housing are removed which permits the filter panel to pivot rearwardly with the lower horizontal edges of the side flanges 27 abutting the upper edge surface of the reservoir 24. Since the flexible conduit 50 and fitting 52 are secured to the filter panel, accidental operation of the pump when the filter panel is released from its secured position at the rear of the unit will not cause a discharge of water from the unit. Further, the edge surface of the central notch 82 in the lower terminal margin of the skirt 26 will engage the pump shaft sleeve 49 and support assembly to limit the rearward pivotal movement of the filter panel. A further limitation of the rearward pivotal movement of the filter panel is provided by the length of flexible conduit 50, which is a length selected to permit only the extent of inclination deemed desirable. For removing the water from the reservoir 24 the clip-on fitting 52 may be easily removed from the filter panel 25, placed in another vessel adjoining the humidifier and the unit turned on to pump out the reservoir. This also eliminates the need for a drain in the bottom of the reservoir.

Although but one embodiment has been shown and described, it will be apparent to those skilled in the art that various changes and modifications may be made therein without departing from the spirit of the invention or from the scope of the appended claims.

What is claimed is:

1. In an evaporator device having a housing with inlet and outlet openings and air circulating means for inducing a flow of air through said housing, a filter panel removably secured to said housing and having an apertured portion, said panel spanning the path of said flow of air adjacent said inlet opening to cause said flow to pass through said apertured portion; a vaporizer-filter carried by said filter panel in overlying contacting relation to said apertured portion; a water reservoir in a lower portion of said housing; control means for interrupting operation of said air circulating means when the liquid level within said reservoir falls below a predetermined level; means for delivering water from said reservoir to said vaporizer-filter; said filter panel having a rigid downwardly extending skirt forming an integral part thereof and projecting into said reservoir with a lower marginal edge portion that extends below the liquid surface of said reservoir at said predetermined level to form a continuous downwardly extending surface contacting and extending from the lower marginal edge surface of said vaporizer-filter; said skirt being disposed in liquid receiving relation to the lower portion of said filter whereby liquid returning to said reservoir from said filter follows the surface to said skirt and the flow of air about the lower margin of said filter panel is resisted, and means mounting said filter panel and skirt for pivotal movement with respect to said housing.

2. In an evaporator device having a housing with inlet and outlet openings and air circulating means for inducing a flow of air through said housing, a filter panel having an apertured portion; connecting means releasably securing said filter panel to said housing; said panel spanning the path of said flow of air adjacent said inlet opening to cause said flow to pass through said apertured portion; a water reservoir in a lower portion of said housing; said filter panel having a downwardly extending skirt portion with a lower marginal edge portion thereof disposed within said reservoir; a pump assembly supported within said housing for delivering liquid from said reservoir to said vaporizer-filter; said filter panel having transversely extending shoulder portions above said skirt engageable with said reservoir when said filter panel is released from secured relation with said housing to permit the upper portion of said filter panel to pivot away from said housing; and surface means within said reservoir engageable with said lower marginal edge portions of said skirt to limit pivotal movement of said filter panel upper portion away from said housing while said shoulder portions engage said reservoir and support said panel in a rearwardly inclined position.

3. In an evaporator device having a housing including front side and rear wall portions and provided with inlet and outlet openings in said wall portions; means for inducing a flow of air through said housing, a water reservoir in a lower portion of said housing; an air permeable filter disposed in the path of said flow of air; means for delivering water from said reservoir to said filter; a control panel forming a part of said front wall; a lower portion of said front wall being pivotally connected along the lower margin thereof to the remainder of the housing with one pivotal position wherein the upper part of said lower portion is pivoted outwardly from the remainder of said housing; and a fill trough connected along one marginal side thereof to said lower portion of said front wall adjacent the upper end thereof with the side opposite said one side disposed in water delivering relation to said reservoir when said wall portion is in said one pivotal position.

4. In an evaporator device, a housing having air inlet and outlet openings disposed in vertical side-walls thereof; air circulating means for inducing a flow of air into said housing through inlet opening and discharging air in an upwardly inclined path from said outlet opening; a water reservoir in a lower portion of said housing; a filter panel carried by said housing adjacent said inlet opening having side and bottom wall portions projecting inwardly from said panel and an apertured portion in the panel area bounded by said wall portions; an air permeable filter; means supporting said filter on said panel within said wall portions and overlying said apertured portion; pump means for supplying water from said reservoir to said filter; a water distribution channel overlying said filter for providing water delivery along the upper marginal edge of said filter; a water distributor fitting releasably secured to said panel in water delivering relation to said distributor; flexible conduit means interconnecting said pump and said fitting; a front wall section forming a portion of said housing which is pivotally connected to the balance of said housing about a horizontal axis to permit the upper portion to tilt away from the remainder of the housing to a first position; a trough member having one end connected to said wall section adjacent the upper end thereof and the end opposite said one end in water delivering relation to said reservoir when said wall section is in said first position.

5. In an evaporator device having a housing with inlet and outlet openings and means for inducing a flow of air through said housing; a water reservoir in said housing; a filter panel carrying an air permeable filter and disposed in the path of said flow of air to pass air through said filter; a water distributing means associated with said filter panel in water delivering relation to said filter; a water delivery fitting releasably secured to said filter panel in water delivering relation to said water distribution means, said water delivery fitting comprising an extruded portion having a generally U-shaped first wall portion adapted to be received over a portion of the top marginal edge of said filter panel to releasably interconnect said fitting and filter panel and a second wall portion projecting inwardly and downwardly in the assembled condition from the leg of the U-shaped wall portion facing the interior of the cabinet, a pair of end panels each secured to marginal edges of said U-shaped portion leg and said second wall portion to form an enclosure having an elongated opening in the lower portion thereof, and a delivery tube extending through and secured to said second wall portion to communicate with said enclosure above said elongated opening; and means for delivering water from said reservoir to said fitting.

References Cited

UNITED STATES PATENTS

| | | | |
|---|---|---|---|
| 2,201,647 | 5/1940 | Feinberg | 261—29 |
| 2,404,479 | 7/1946 | Essick. | |
| 2,637,540 | 5/1953 | Rowe. | |
| 2,903,224 | 9/1959 | Gooding | 261—106 X |
| 2,998,714 | 9/1961 | Bonzer. | |
| 3,092,096 | 6/1963 | Nett et al. | 261—103 X |
| 3,147,319 | 9/1964 | Goettl | 261—97 X |
| 3,179,386 | 4/1965 | Liebmann | 261—97 X |
| 3,203,676 | 8/1965 | Sprouse et al. | 261—80 X |
| 3,223,393 | 12/1965 | Goettl | 261—97 X |
| 3,253,820 | 5/1966 | Seil | 261—97 X |

HARRY B. THORNTON, *Primary Examiner.*

T. R. MILES, *Assistant Examiner.*